UNITED STATES PATENT OFFICE.

MAURIZIO BARRICELLI, OF BYGDÖ, NEAR CHRISTIANIA, NORWAY.

PROCESS FOR THE MANUFACTURE OF AN ELASTIC MATERIAL FOR USE IN TIRES AND OTHER OBJECTS.

1,200,296.

Specification of Letters Patent.  Patented Oct. 3, 1916.

No Drawing.  Application filed July 18, 1914.  Serial No. 851,787.

*To all whom it may concern:*

Be it known that I, MAURIZIO BARRICELLI, a subject of the King of Italy, residing at Bygdö, near Christiania, Norway, have invented certain new and useful Improvements in Processes for the Manufacture of an Elastic Material for Use in Tires and other Objects; and I do hereby declare the following to be a full, clear, and exact description of the invention, such as will enable others skilled in the art to which it appertains to make and use the same.

This invention has for its object a process for the manufacture of an elastic material for use in tires and other objects.

As is well known the employment of pneumatic tires for automobiles and velocipedes is connected with dangers and difficulties of various kinds in most cases caused by punctures resulting in the escape of air from the tire tube and bursting of the same. Much work has therefore been spent to overcome and avoid these difficulties and inconveniences. It has been proposed to substitute the pneumatic tires with solid rubber tires or with tires of cork, rubber sponge, metal spirals, metal brushes and the like. It has also been proposed to produce elasticity in other parts of the wheel. Although the means proposed have been very ingenious, the result has proven the product to be inferior to the pneumatic rubber tires. It has also been proposed as a material in the production of tires to employ compositions containing principally gelatin glue or other similar colloidal substances together with a hygroscopic substance such as glycerin, molasses and the like, the necessary insolubility having been imparted to such compositions by subjecting them to a hardening process by means of formaldehyde and various tanning agents. To prevent too rapid or too excessive hardening of such compositions various additions such as acids or acid substances, turpentine and the like have also been proposed. As far as I know however one has not hitherto succeeded in producing from these bodies materials suitable for tires. In actual use the masses produced according to the known processes have proved to be unable to resist the temperature (of about 80–90° C.) which they attain when the vehicle in question is running and have melted and caused the cover to burst or the compositions have gradually lost their power of resistance and have crumbled during its use.

According to the present invention it has been made possible by a special process to produce materials which do not have the drawbacks mentioned, but which are able to resist temperatures of more than 100° C. without melting, and which nevertheless do not crumble during use.

This process is based upon the recognition of the fact that in the production of materials of this kind the result does not exclusively depend upon the nature of the components of the composition but that the character of the product is greatly influenced by the consecutive order in which the components are mixed together and by other conditions prevailing during the production of the composition. Further quite small variations in the proportions of the various components effect important changes in the character of the product as hereinafter referred to. Starting from this recognition as a basis I have made a great number of experiments and have succeeded in producing a material, which by actual use during a long time has proved entirely satisfactory.

In the production of the material I employ besides the known principal components of colloidal and hygroscopic bodies also hardening agents together with substances which prevent too rapid or excessive hardening. Further I preferably employ as an addition antimony pentasulfid, which in combination with the other components has been found to impart to the mass a greater tenacity. By working in the manner below described a very suitable product has been obtained.

4 kg. of bone glue and 1 kg. of gelatin were melted and mixed to a plastic paste with 3 kg. of water and 3 kg. of glycerin. To this mass were first added 0.050 kg. of antimony pentasulfid and when the whole had been well mixed 0.5 liter of acetic acid was added and incorporated into the mass. The mixture so produced was held in a fluid state on a boiling water bath for some time and immediately before the molding there was added to the mass a liquid containing 0.5 liter of acetic acid and 1 liter of 40% aqueous solution of formaldehyde, this liquid being incorporated into the mass by means of powerful and rapid stirring. Immediately afterward the mass was filled into molds and cooled.

By varying the relative quantity of glycerin and water one may at will obtain a material of higher or lower elasticity. The acetic acid may be wholly or partly substituted by other substances exerting a similar action such as acids of various kinds, acid compounds and the like and instead of the 40% aqueous solution of formaldehyde one may also employ other hardening agents alone or mixed with one another or with 40% aqueous solution of formaldehyde; such bodies are for instance alum, chromates, especially chromate of potassium or ammonium, tannic acid and iron compounds, etc. Likewise one may advantageously employ as an addition a substance produced by treating hot glue with a 40% aqueous solution of formaldehyde and immediately afterward disintegrating the mass in a mortar. Of this product a small quantity is mixed with the whole mass before it is brought into the molds.

It will be understood from the above that the various components may to a certain extent be substituted by other substances. But it is of the greatest importance that the hardening agent be mixed with the acid (or its equivalent) before it is added to the mass, and that this mixture is added to the mass first when this latter has been mixed with part of the acid and heated for some time, and immediately before the molding and cooling.

By experiments which I have made it has further been found, that when raw glycerin, as obtained by saponification of fats and oils with sulfuric acid, is employed in compositions of the character specified, the gelatin obtains a very high power of resistance. It has also been found that by the use of gelatin of a slightly acid reaction there is produced an enormous development of small gas bubbles which makes the mass highly porous. Experiments have also proved that by mixing substances of great thermal conductivity for instance powder of aluminium with the mass it is possible to prevent the temperature of the mass of the tire from rising very high during the use. In producing a suitable mass by the use of the said special quality of glycerin and powder of aluminium the following proportions may be employed: Gelatin 10 parts, dark (raw) glycerin 5 parts, light (purified) glycerin 2 parts, water 3 parts, bichromate of potassium 0.25 part, bichromate of ammonium 0.25 part, molasses 2 parts, antimony pentasulfid 0.05 part, powder of aluminium 0.1 part. Thus the strain on the tire will be distributed over the whole section, from which follows that the durability of the cover is considerably increased. Further the tire has a great power of resistance against slipping on the ground and allows of an entirely quiet running, whereby the motor and other mechanisms secured to the car frame are spared. Further every possibility of a bursting of the tire and drawbacks and dangers resulting therefrom are excluded even if the tire is penetrated by a pointed body or by a projectile.

I claim:

1. The process of manufacturing elastic materials for tires and other bodies, which comprises producing a hot solution of gelatin, incorporating therein an acid, maintaining the mass so produced fluid until ready to mold, and adding thereto immediately before molding a solution containing formaldehyde and an acid.

2. The process of manufacturing elastic materials for tires and other bodies, which comprises producing a hot solution of gelatin, incorporating therein first a quantity of antimony pentasulfid and then a quantity of acid, maintaining the mass fluid until ready for molding, and immediately before molding incorporating therein a solution of formaldehyde and acetic acid.

3. The process of manufacturing elastic material for tires and other bodies, which consists in melting together 4 kg. of bone glue, 1 kg. of gelatin, 3 kg. of glycerin and 4 kg. of water, incorporating into the mass so obtained first 0.05 kg. of antimony pentasulfid, and then 1.5 liters acetic acid, maintaining the mixture in a heated fluid state, and then incorporating into the mass, immediately before the molding operation while rapidly and powerfully stirring the same, a mixture of 0.5 liter acetic acid and one liter of formaldehyde.

4. The process of manufacturing elastic material for tires and other bodies, which comprises producing a hot solution of gelatin with water and raw glycerin, incorporating in said solution first a quantity of antimony pentasulfid and then a quantity of acetic acid, maintaining the mass so produced in a fluid state until it is to be molded, and adding to the mass immediately before the molding operation a quantity of a liquid containing formaldehyde and acetic acid.

5. The process of manufacturing elastic material for tires and other bodies, which comprises producing a hot solution of gelatin with water and glycerin, incorporating in said solution first a quantity of antimony pentasulfid and then a quantity of acetic acid, maintaining the mass so produced in a fluid state until it is to be molded, adding to the mass immediately before the molding operation a quantity of a liquid containing formaldehyde and acetic acid, and incorporating into the mass at a suitable stage of the process a substance having great thermal conductivity.

6. The process of manufacturing elastic material for tires and other bodies, which comprises producing a hot solution of gelatin with water and glycerin, incorporating in said solution first a quantity of antimony pentasulfid, and then a quantity of acetic acid, maintaining the mass so produced in a liquid state until it is to be molded, adding to the mass immediately before the molding operation a quantity of a liquid containing formaldehyde and acetic acid, and incorporating into the mass at a suitable stage of the process a quantity of aluminium.

In testimony that I claim the foregoing as my invention, I have signed my name in presence of two subscribing witnesses.

MAURIZIO BARRICELLI.

Witnesses:
MARNA NOEL BARRICELLI,
RUTH LINDSTRÔM,